United States Patent [19]

Sakakibara et al.

[11] Patent Number: 4,705,003

[45] Date of Patent: Nov. 10, 1987

[54] APPARATUS FOR CONTROLLING ELECTROEXPANSIVE ACTUATOR AVOIDING DETERIORATION OF POLARIZATION

[75] Inventors: Yasuyuki Sakakibara, Nishio; Seiko Abe, Okazaki; Masahiro Tomita, Anjo; Hiroshi Yorita, Nishio; Takeshi Tanaka, Toyohashi; Toshihiko Igashira, Toyokawa, all of Japan

[73] Assignee: Nippon Soken, Inc., Nishio, Japan

[21] Appl. No.: 788,485

[22] Filed: Oct. 17, 1985

[30] Foreign Application Priority Data

Oct. 17, 1984 [JP] Japan ............................ 59-216047
Sep. 2, 1985 [JP] Japan ............................ 60-191969

[51] Int. Cl.$^4$ ..................... F02M 41/12; H01L 41/08
[52] U.S. Cl. ................................. 123/449; 123/357; 123/490; 310/317; 310/358

[58] Field of Search ............... 123/357, 449, 450, 447, 123/498, 506, 478, 490, 446; 310/316, 317, 358, 359

[56] References Cited

U.S. PATENT DOCUMENTS

| | | | |
|---|---|---|---|
| 2,607,858 | 8/1952 | Mason ............................. | 310/358 X |
| 2,659,829 | 11/1953 | Baerwald ........................ | 310/358 X |
| 3,589,345 | 6/1971 | Benson ............................ | 123/498 X |
| 4,463,727 | 8/1984 | Babitzka et al. ................. | 123/498 X |
| 4,522,174 | 6/1985 | Babitzka et al. ................. | 123/450 X |
| 4,535,743 | 8/1985 | Igashira et al. .................. | 123/478 X |
| 4,608,958 | 9/1986 | Sakakibara et al. ............. | 123/498 X |

Primary Examiner—Tony M. Argenbright
Attorney, Agent, or Firm—Cushman, Darby & Cushman

[57] ABSTRACT

In an apparatus for controlling an electroexpansive actuator, a high voltage is applied to the electroexpansive actuator at a non-load state after an expansion and contraction operation thereupon is completed.

13 Claims, 36 Drawing Figures

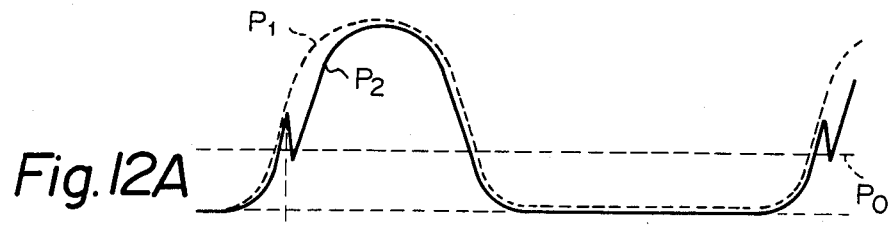
Fig.12A
Fig.12B  SHORTED  OPEN
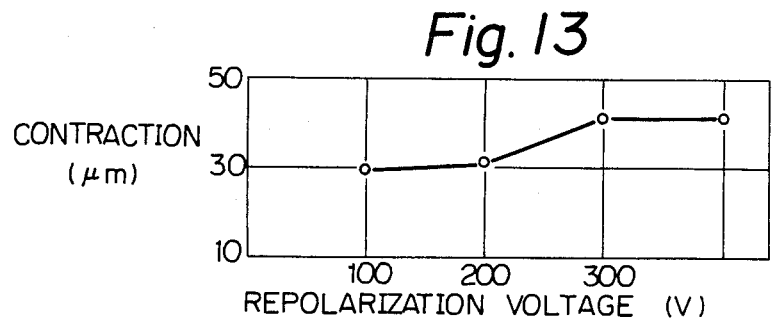
Fig. 13
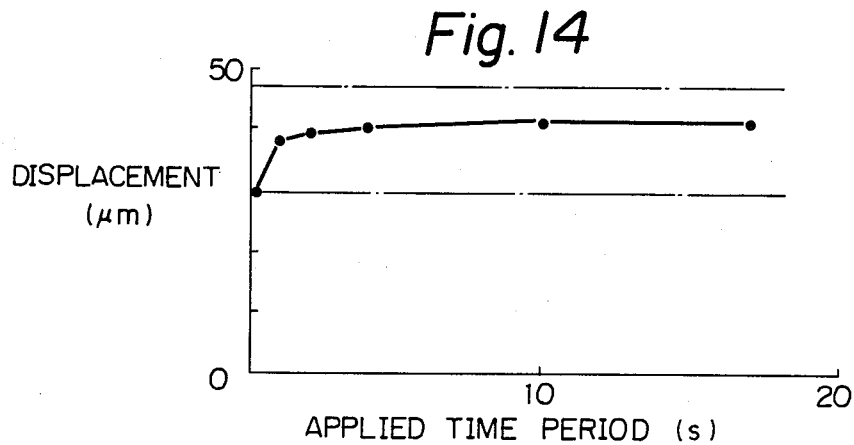
Fig. 14

Fig. 15
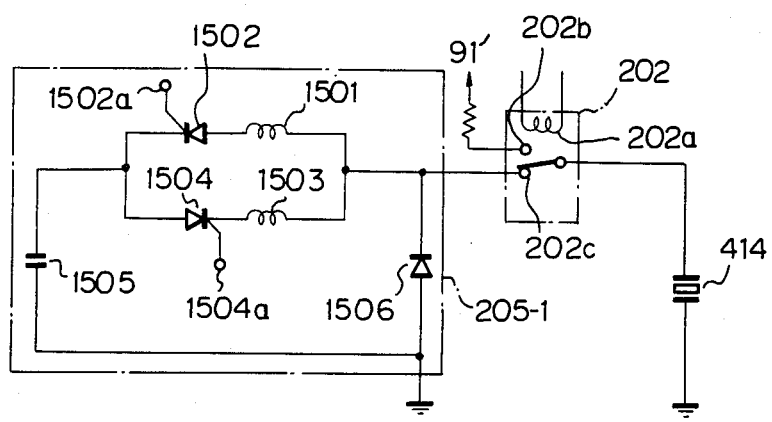
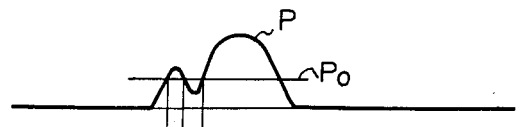
Fig. 16A
Fig. 16B
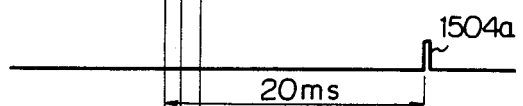
Fig. 16C
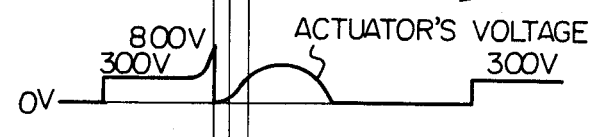
Fig. 16D
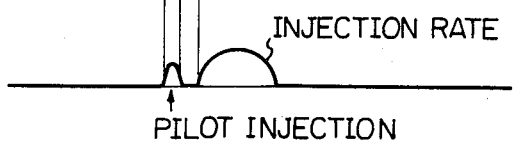
Fig. 16E

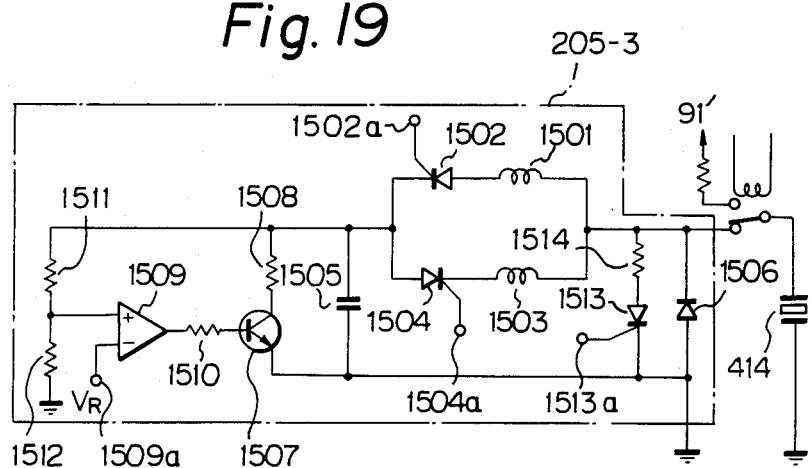
Fig. 19
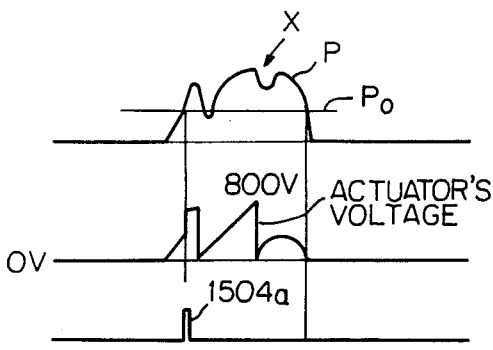
Fig. 20A
Fig. 20B
Fig. 20C
Fig. 20D
Fig. 20E
Fig. 20F
Fig. 20G

APPARATUS FOR CONTROLLING ELECTROEXPANSIVE ACTUATOR AVOIDING DETERIORATION OF POLARIZATION

BACKGROUND OF THE INVENTION

1. Field of the Invention

The present invention relates to an apparatus for controlling an electroexpansive actuator which is used in a fuel injection valve of a spark ignition internal combustion engine, a fuel injection apparatus of a diesel engine, or the like.

2. Description of the Related Art

In general, an electroexpansive actuator comprises a plurality of columnar laminated piezoelectric elements having an electroexpansive effect. Each piezoelectric element comprises a PZT ® ceramic obtained by sintering lead zirconium titanate. In manufacturing such an electroexpansive actuator, a direct voltage is applied to each piezoelectric element so as to generate polarization therein, thereby preserving a high electroexpansive effect. However, when a repeated load is applied to each piezoelectric element, the polarization thereof is deteriorated, and accordingly, the electroexpansive effect thereof is deteriorated. For example, as illustrated in FIG. 1, which shows the characteristics of the displacement of a laminate of 80 piezoelectric elements each having a diameter of 15 mm and a thickness of 0.5 mm, when the endurance time period increases, the displacement decreases due to the deterioration of polarization. Therefore, if such an expansive actuator is used in a fuel injection valve of a spark ignition engine or in a fuel injection apparatus of a diesel engine, the amount of injected fuel may decrease.

SUMMARY OF THE INVENTION

It is an object of the present invention to provide an apparatus for controlling an expansive actuator in which deterioration of the polarization, i.e., deterioration of the electroexpansive effect, is avoided.

It is another object of the present invention to provide a spark ignition engine having a fuel injection valve formed by such an electroexpansive actuator in which deterioration of polarization, i.e., deterioration of the electroexpansive effect, is avoided.

It is still another object of the present invention to provide a diesel engine having a fuel injection apparatus formed by such an electroexpansive actuator in which deterioration of polarization, i.e., deterioration of the electroexpansive effect, is avoided.

According to the present invention, a high voltage is applied to an electroexpansive actuator in a non-load state, thereby performing a repolarization operation upon the electroexpansive actuator. In a spark ignition engine or a diesel engine, at the time the engine is stopped, a high voltage is applied to the electroexpansive actuator of a fuel injection valve or of a fuel injection apparatus. As a result, the electroexpansive actuator is again polarized to preserve its electroexpansive effect.

BRIEF DESCRIPTION OF THE DRAWINGS

The present invention will be more clearly understood from the description as set forth below with reference to the accompanying drawings, wherein:

FIGS. 12A and 12B are timing diagrams showing the operation of the fuel injection rate control circuit of FIG. 9;

FIG. 13 is a graph showing the characteristics of the repolarization voltage in FIG. 9;

FIG. 14 is a graph showing the characteristics of duration of the repolarization voltage in FIG. 9;

FIG. 15 is a circuit diagram of a modification of the fuel injection rate control circuit of FIG. 9;

FIGS. 16A through 16E are timing diagrams showing the operation of the circuit of FIG. 15;

FIG. 19 is a circuit diagram of a further modification of the fuel injection rate control circuit of FIG. 9;

FIGS. 20A through 20G are timing diagrams showing the operation of the circuit of FIG. 19.

DESCRIPTION OF THE PREFERRED EMBODIMENTS

Figure 1:
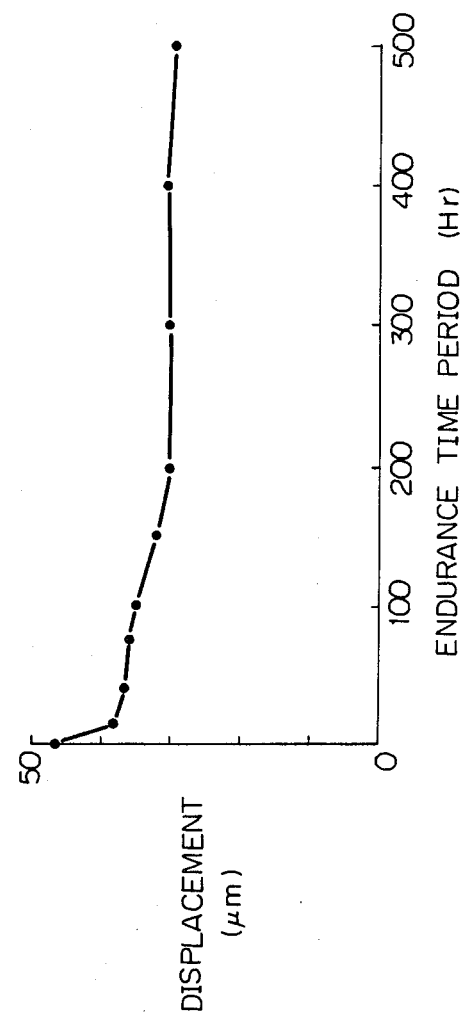
FIG. 1 is a graph showing the deterioration of polarization of an electroexpansive actuator.
Figure 2:
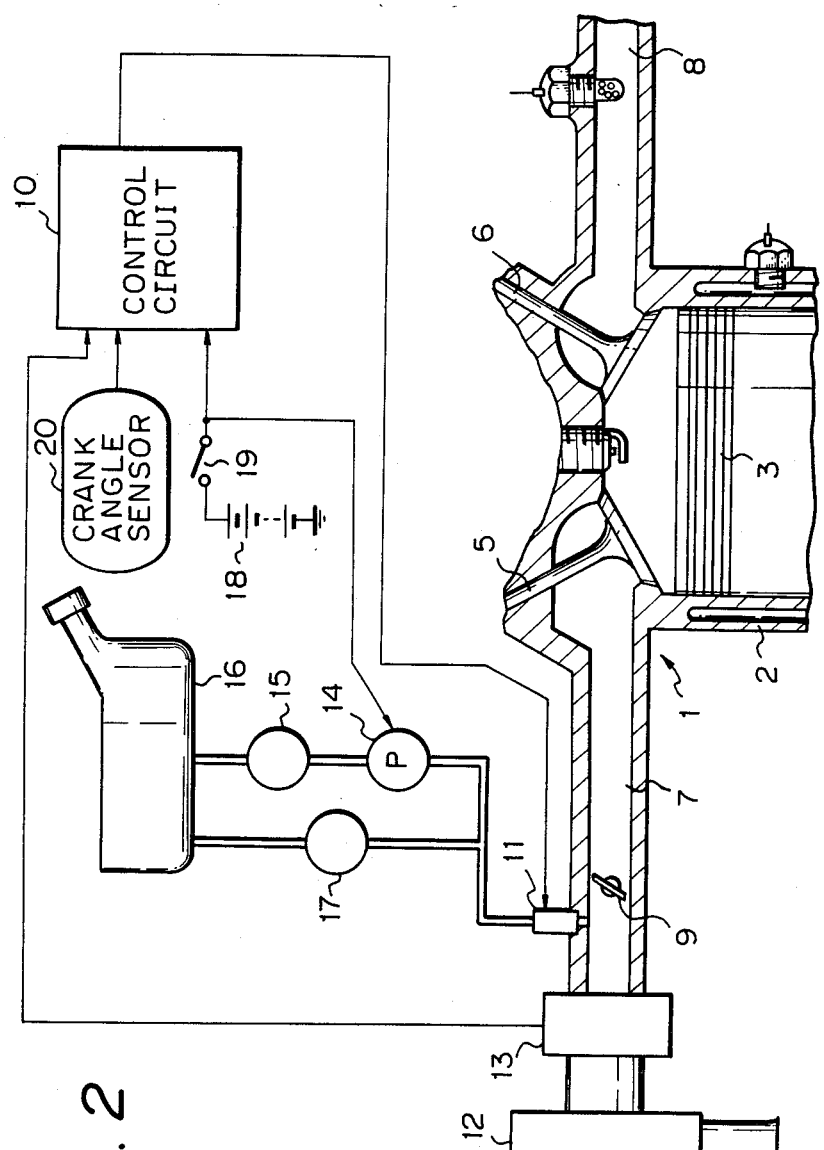
FIG. 2 is a schematic view of a spark ignition internal combustion engine according to the present invention.

In FIG. 2, which is a schematic view of a spark ignition internal combustion engine according to the present invention, reference numeral 1 designates a spark ignition internal combustion engine. The engine 1 comprises a cylinder block 2, a piston 3, an ignition plug 4, an intake valve 5, an exhaust valve 6, an intake pipe 7, an exhaust pipe 8, and the like. Disposed within the intake pipe 7 is a throttle valve 9. Also provided in the wall of the intake pipe 7 is a fuel injection valve 11.

The fuel injection valve 11 is operated by the expansion/contraction of an electroexpansive actuator. The electroexpansive actuator comprises a plurality of columnar laminated piezoelectric elements having an electroexpansive effect. Each piezoelectric element comprises a PZT ® ceramic obtained by sintering lead zirconium titanate. In the case where the piezoelectric element has a diameter of 15 mm and a thickness of 0.5 mm, when a voltage of +500 V is applied to the element, the element expands by about 0.5 μm along the axial direction of the column. Therefore, when a 100 of such elements are laminated together, a 50 μm expansion/contraction can be obtained.

The intake pipe 7 leads to the open air via an air cleaner 12. Provided on the downstream side of the air cleaner 12 is an airflow meter 13 which generates an analog voltage in proportion to the intake air flow rate.

Fuel is supplied from a fuel tank 16 via a feed pump 14 and a filter 15. In this case, the fuel feed pressure is maintained at a definite level, such as 3 kg/cm$^2$, by a pressure regulator 17. Note, fuel spilled from the pressure regulator 17 returns to the fuel tank 16. The fuel pump 14 is connected to a battery 18 via an ignition switch 19. Therefore, when the ignition switch 19 is turned on, the feed pressure of fuel is applied to the fuel injection valve 11 so that the electroexpansive actuator thereof is in a load state. Conversely, when the ignition switch 19 is turned off, the electroexpansive actuator is in a non-load state.

Reference numeral 20 designates a crank angle sensor provided at the distributor (not shown).

A control circuit 10 processes the output signals of the airflow meter 13, the ignition switch 19, the crank angle sensor 20 and the like to control the fuel injection valve 11. The control circuit 10 may comprise a microcomputer.

Figure 3:
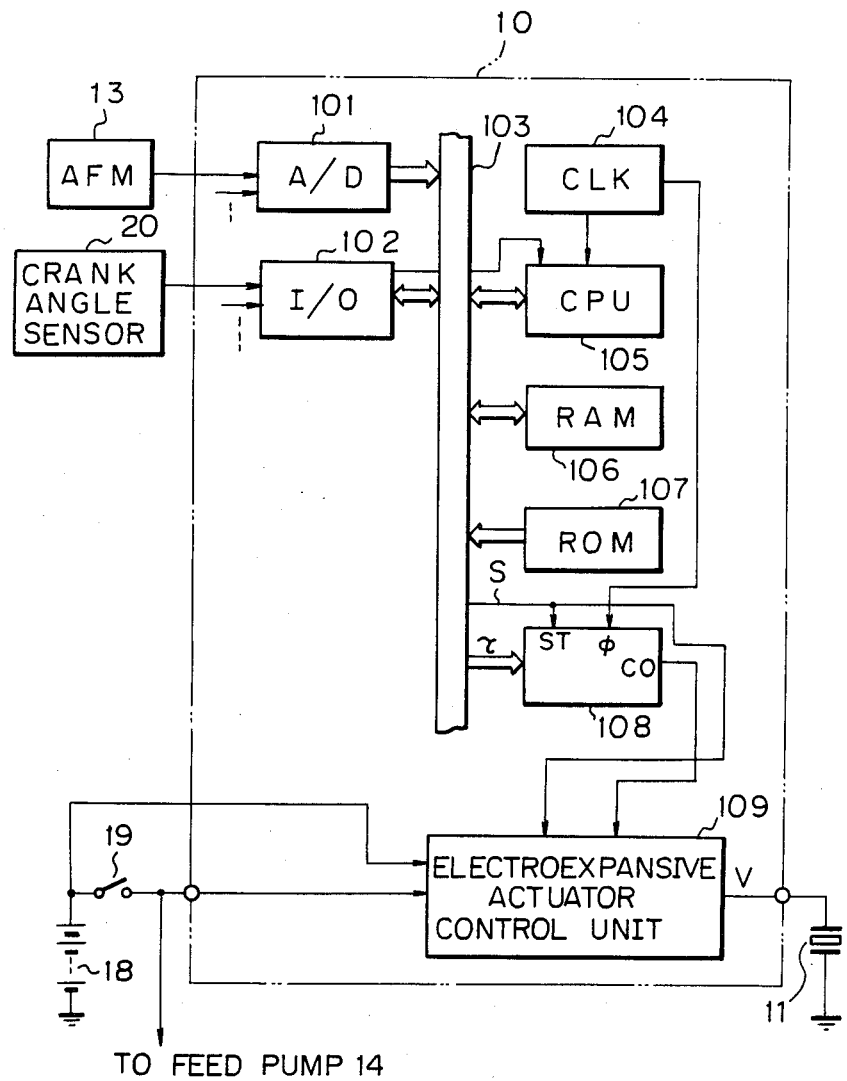
FIG. 3 is a block circuit diagram of the control circuit of FIG. 2.

The control circuit 10 of FIG. 2 will be explained with reference to FIG. 3. In FIG. 3, an analog/digital (A/D) converter 101 converts an analog output signal of the airflow meter 13 into a 16-bit digital signal which is supplied to a bus line 103. An A/D conversion routine for the output signal of the airflow meter 13 is carried out at every predetermined time period, and the obtained intake air amount data Q is stored in a predetermined area of the random access memory 106. Also, the output signal of the crank angle sensor 20 is supplied via an input/output interface 102 as an interrupt signal to a central processing unit (CPU) 105. As a result, in an interrupt routine, an engine speed Ne is calculated and is stored in a predetermined area of the RAM 106. That is, the update intake air amount data Q and the update engine speed data Ne is stored in the RAM 106.

A clock generating circuit 104 generates a time interrupt signal request signal and supplies it to the CPU 105, and generates a clock signal and supplies it to a down counter 108.

A RAM 108 is used for storing temporary data. A ready-only memory (ROM) 107 is used for storing a main routine, various interrupt routines, constants necessary for the routines, and the like.

The down counter 108 has a strobe terminal ST, a clock input terminal $\phi$, a clock enable input terminal CE, and a carry-out output terminal CO. When a strobe signal S is supplied from the CPU 105 via one bit of the bus line 103 to the strobe terminal ST of the down counter 108, a fuel injection time period $\tau$ is preset therein. Simultaneously, an electroexpansive actuator control unit 109 is set so as to initiate a fuel injection. Then, the down counter 108 is counted down by the clock signal. When the value of the down counter 108 reaches 0, the carry-out output terminal CO becomes level "1" so that the electroexpansive actuator control unit 109 is reset. As a result, the counting operation of the down counter 108 is stopped, and simultaneously, the carry-out terminal CO becomes level "1". Thus, the fuel injection is carried out for the fuel injection time period $\tau$ after the generation of the strobe signal S.

According to the present invention, the electroexpansive actuator control unit 109 is connected directly to the battery 108, and as a result, even after the ignition switch 19 is turned off, the electroexpansive actuator control unit 109 can operate the fuel injection valve 11. That is, even after the feed pump 14 is stopped so that the fuel injection valve 11 is in a non-load state, the electroexpansive actuator control unit 109 can operate the fuel injection valve 11, thereby performing a repolarization operation upon the electroexpansive actuator thereof.

Figure 4:
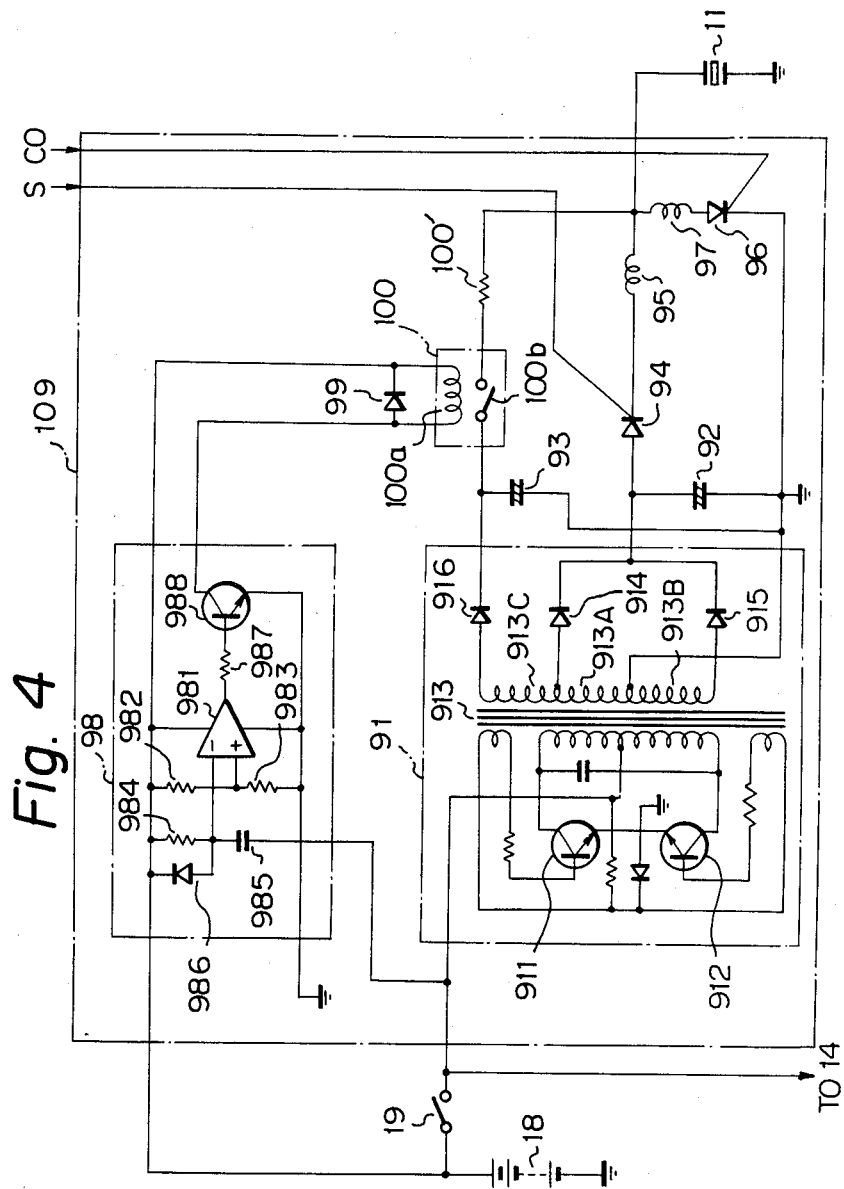
FIG. 4 is a circuit diagram of an example of the electroexpansive actuator control unit of FIG. 3.

An example of the electroexpansive actuator control unit 109 of FIG. 3 will be explained with reference to FIG. 4. In FIG. 4, reference numeral 91 designates a DC/DC converter which is comprised of transistors 911 and 912, a transformer 913, diodes 914, 915, and 916, and the like. The DC/DC converter 91 converts a low direct voltage to a high direct voltage. The transformer 913 has a secondary winding divided into a winding portion 913A, a winding portion 913B, and a winding portion 913C. The winding 913A has the same turns as the winding 913B, and their connection is grounded. The output of the winding portion 913A is charged via a diode 914 to a capacitor 92, while the output of the winding portion 913B is charged via a diode 915 to the capacitor 92. Thus, a high voltage of about 350 V is stored in the capacitor 92. Also, the output of the winding portion 913C is charged via a diode 916 to a capacitor 93, and accordingly, a high voltage of about 800 V is stored in the capacitor 93.

A conventional polarization driver for the electroexpansive actuator comprises a first thyristor 94 connected to the capacitor 92, a first inductor 95 connected in series to the first thyristor 94, a second thyristor 96 which is grounded, and a second inductor 97. In this case, the connection of the first inductor 95 and the second inductor 97 is connected to the fuel injection valve (electroexpansive actuator) 11. Therefore, when the thyristor 94 is triggered by the strobe signal S of FIG. 3, the high voltage of the capacitor 92 is applied via the first inductor 95 to the fuel injection valve 11, so that the electroexpansive actuator thereof expands to initiate a fuel injection. Then, after a predetermined time period $\tau$ passes, the second thyristor 96 is triggered by the carry-out signal CO of the down counter 108 of FIG. 4, and accordingly, the voltage of the electroexpansive actuator is removed by the second inductor 97 to contract the electroexpansive actuator, thus completing the fuel injection.

A repolarization driver for the electroexpansive actuator comprises a timer circuit 98, a diode 99, a relay circuit 100, and a resistor 100'. The repolarization driver applies the high voltage of 800 V stored in the capacitor 93 to the electroexpansive actuator for a predetermined time period such as 5 s immediately after the ignition switch 19 is turned off.

In a comparator 981 of the timer circuit 98, a voltage such as 6 V obtained by dividing the voltage of the battery 18 with resistors 982 and 983 is applied to a non-inverting input thereof, while its inverting input is connected via a resistor 984 to the battery 18 and is also connected via a capacitor 985 to the ignition switch 19. A diode 986 is used for rapidly discharging the capacitor 985 when the ignition switch 19 is turned on. The output of the comparator 981 is connected via a resistor 987 to the base of a transistor 988, and accordingly, when the output of the comparator 981 is high, the transistor 988 is turned on. The collector of the transistor 988 is connected to a winding 100a of the relay circuit 100, and accordingly, when the transistor 988 is turned on, the relay circuit 100 is turned on to turn on the contact 100b thereof. A diode 99 is used for the intake of surge currents when the transistor 988 is turned on. When the contact 100b of the relay circuit 100 is turned on, the high voltage of 800 V stored in the capacitor 93 is applied via the current limiting resistor 100' to the fuel injection valve 11.

As explained above, a repolarization is carried out after the ignition switch 19 is turned off. That is, immediately before the ignition switch 19 is turned off, 800 V is charged in the capacitor, and the voltage of the capacitor 985 is 0 by the diode 986. Also, since the inverting input of the comparator 981 is 12 V (the battery voltage) and its non-inverting input is 6 V by the resistors 982 and 983, the output of the comparator 981 is low so as to turn off the transistor 988, i.e., the contact 100b of the relay circuit 100. In this state, when the ignition switch 19 is turned off, the potential of the capacitor 985 on the side of the ignition switch 19 becomes about zero thereby changing the output of the comparator 981. As a result, the transistor 988 is turned on, and accordingly the contact 100b of the relay circuit 100 is turned on. Therefore, a high voltage of 800 V is applied via the resistor 100' to the electroexpansive actuator of the fuel injection valve 11. After that, the potential at the inverting input of the comparator 981 rises since the capacitor 985 is charged via the resistor 984, and then this potential exceeds the potential (6 V) at the non-inverting input of the comparator 981, thereby again changing the output thereof. The on-duration of the transistor 988 is set by a time constant determined by the resistance of the resistor 984 and the capacity of the capacitor 985, and is, for example, about 5 s.

Thus, when about 5 s has passed after the ignition switch 19 is turned off, the transistor 988 is turned off, and accordingly, the contact 100b of the relay circuit 100 is also turned off, thereby completing a repolarization of the electroexpansive actuator of the fuel injection valve 11.

Figure 5:
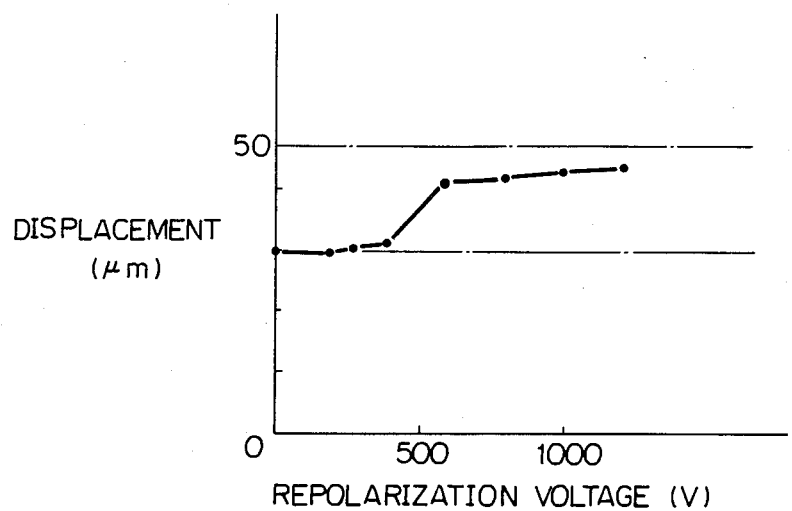
FIG. 5 is a graph showing the characteristics of the repolarization voltage in FIG. 4.
Figure 6:
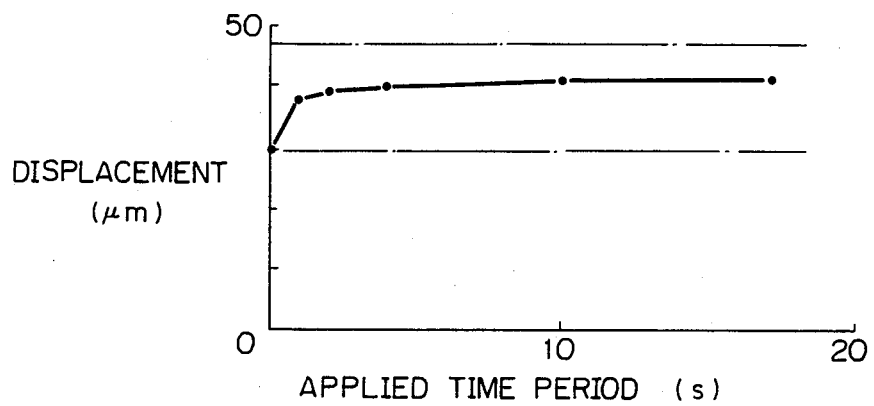
FIG. 6 is a graph showing the characteristics of duration of the repolarization voltage in FIG. 4.

As illustrated in FIG. 5, in view of the repolarization, it is preferable to apply a voltage higher than 300 V to an electroexpansive actuator including a laminate of 80 piezoelectric elements each having a diameter of 15 mm and a thickness of 0.5 mm. That is, it is preferable to generate an electric field higher than 600 V/mm in the electroexpansive actuator. As illustrated in FIG. 6, when 300 V is applied to such an electroexpansive actuator, this actuator recovers its initial state within a few seconds.

Figure 7:
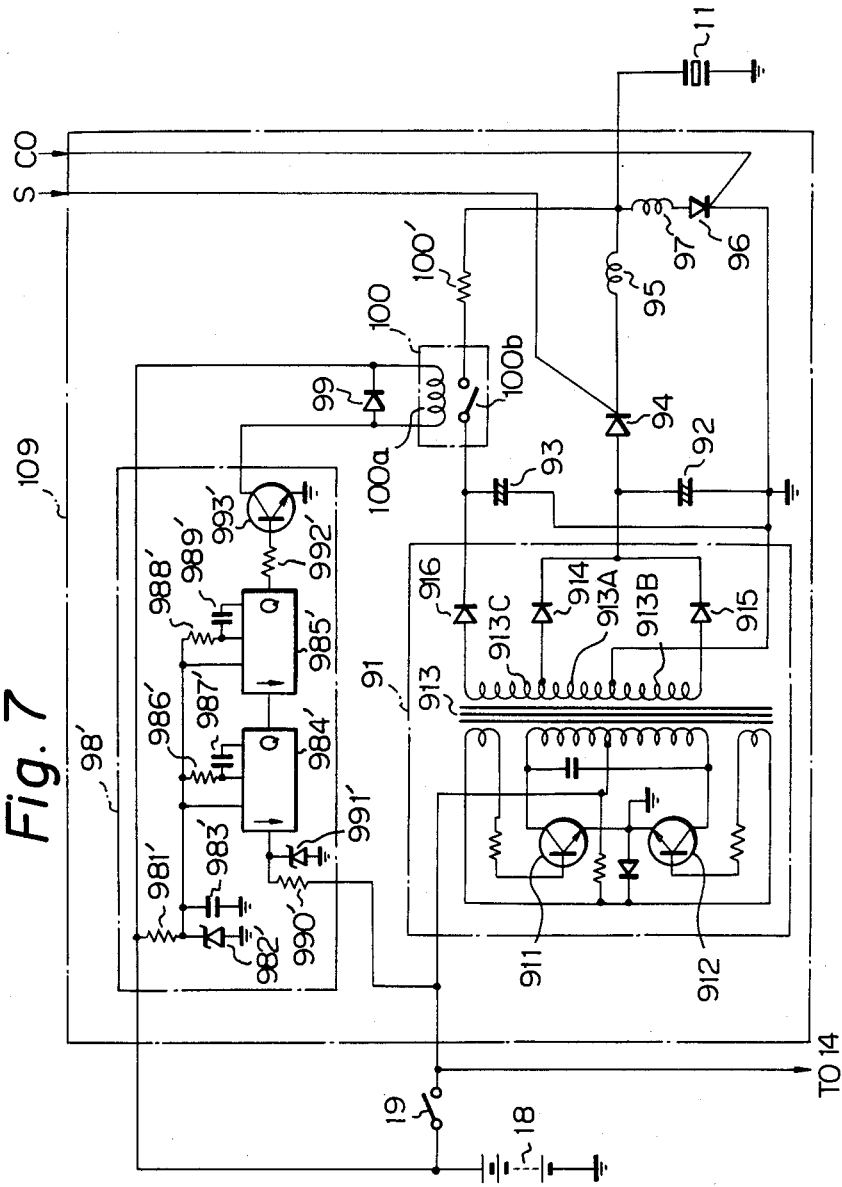
FIG. 7 is a circuit diagram of another example of the electroexpansive actuator control unit of FIG. 3.

In FIG. 7, which illustrates another example of the electroexpansive actuator control unit of FIG. 3, a timer circuit 98' is different from the timer circuit of FIG. 4, thereby carrying out a repolarization when a predetermined time period such as about 20 s passes after the ignition switch 19 is turned off. Such a delay time period (20 s) is sufficient for the feed pressure of fuel to reach atmospheric pressure.

In the timer circuit 98' of FIG. 7, a resistor 981', a Zener diode 982', and a capacitor 983' generate a constant voltage such as about 5 V which is applied to one-shot multivibrators 984' and 985' (Texas Instruments 74LS-221). The pulse duration of the one-shot multivibrator 984' is determined by a resistor 986' and a capacitor 987', and is, in this case, about 20 s, which corresponds to the period from the timing when the ignition switch 19 is turned off to the timing when the feed pressure of fuel reaches atmospheric pressure. In addition, the pulse duration of the one-shot multivibrator 985' is determined by a resistor 988' and a capacitor 989', and is, in this case, about 5 s for one repolarization. Note that both of the one-shot multivibrators 984' and 985' are triggered by each fall of their own input potentials.

Applied to the fall trigger input of the one-shot multivibrator 984' is the voltage of the battery 18 via the ignition switch 19. In this case, the voltage of the battery 18 is limited by a resistor 990' and a Zener diode 991'. Also, applied to the fall trigger input of the one-shot multivibrator 985' is the output of the one-shot multivibrator 984'. Further, the output of the one-shot multivibrator 985' is connected via a resistor 992' to the base of a transistor 993'. The resistor 992' and the transistor 993' correspond to the resistor 987 and the transistor 988, respectively. Thus, when the transistor 993, is turned on, the contact 100b of the relay circuit 100 is turned on thereby carrying out a repolarization.

As explained above, a repolarization is carried out when about 20 s passes after the ignition switch 19 is turned off. That is, when the ignition switch 19 is turned off, the one-shot multivibrator 984' is triggered so as to initiate the measure of the duration of about 20 s. As a result, when about 20 s has passed, the one-shot multivibrator 985' is triggered by the fall of the output of the one-shot multivibrator 984', so that the one-shot multivibrator 985' initiates the measure of the duration of the about 5 s. As a result, the transistor 993' is being turned on for this 5 s, and accordingly, the contact 100b of the relay circuit 100 is turned on for this 5 s, thereby applying a high voltage of 800 V to the electroexpansive actuator of the fuel injection valve 11.

Figure 8:
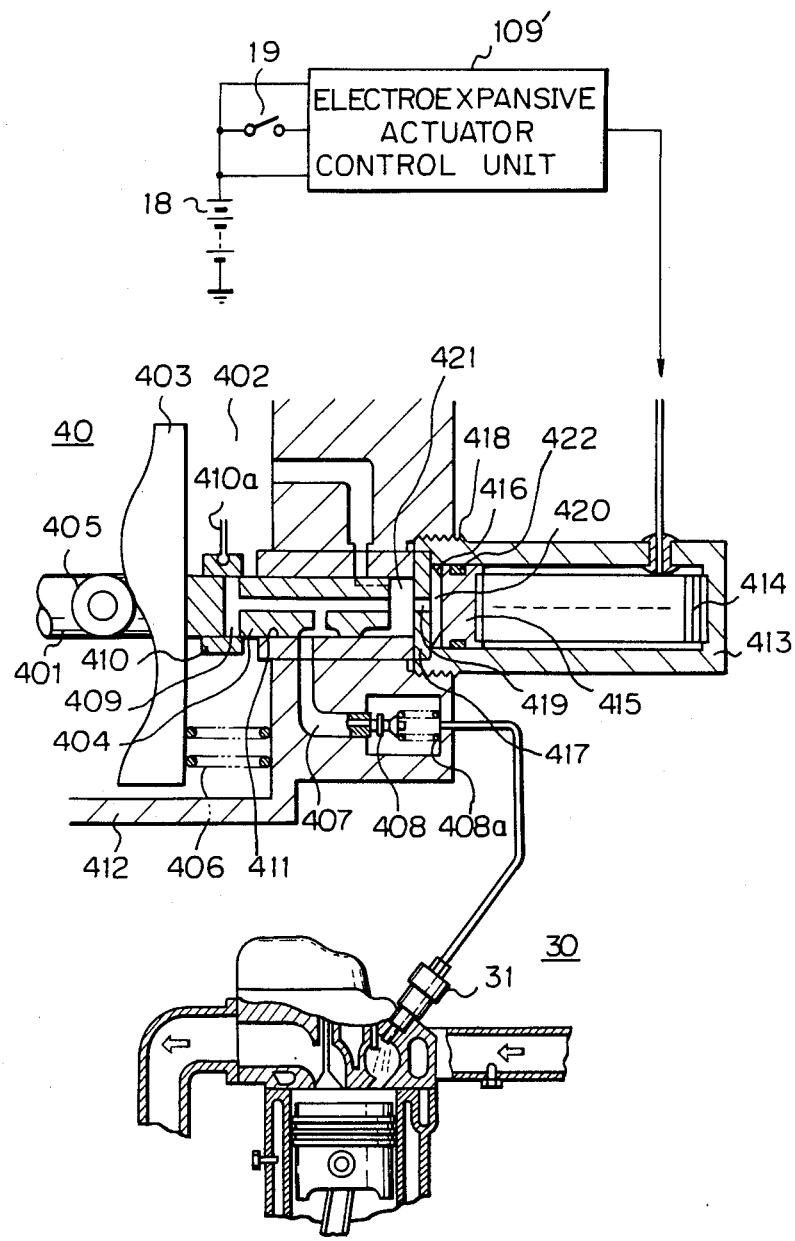
FIG. 8 is a schematic view of a diesel engine according to the present invention.

In FIG. 8, which illustrates a diesel engine according to the present invention, reference numeral 30 designates a diesel engine, and 40 designates a distributor-type fuel injection pump.

Provided in the prechamber of the engine 30 is a fuel injection nozzle 31 for supplying compressed fuel from the fuel-injection pump 40 into the respective intake-air port.

The fuel injection pump 40 comprises a centrifugal type (vane type) of the fuel pump (not shown) coupled to a drive shaft 401 of the engine 30. The fuel pump 401 sucks up a predetermined amount of fuel from the fuel tank (not shown) at every rotation of the drive shaft 401. The fuel pressure of the fuel pump is supplied.

The drive shaft 401 drives a cam plate 403 and a pump plunger 404, as well as the feed pump. The cam plate 403 and the plunger 404 are pushed onto a fixed roller 405 by a plunger spring 406. When the cam plate 403 is rotated so that the cam face thereof rides on the rollers 405, the pump plunger 404 performs a predetermined stroke action. Since the pump plunger 404 simultaneously performs a rotary action, the fuel is sucked and is compressed and delivered. Delivery of the compressed fuel is started by the rise of the pump plunger 404, and the fuel is supplied via a distributive passage 407 and a delivery valve 408 to a fuel injection nozzle 31. The delivery valve 408 is supported by a spring 408a. Delivery of the compressed fuel is terminated when the pump plunger 404 rises further so that the spill port 409 thereof is opened at the right portion of a spill ring 410, which is adjusted by a level 410a.

The pump plunger 404 is slidably mounted within a cylinder bore 411 of a casing 412.

In order to control the fuel injection rate, a casing 413, an electroexpansive actuator 414, a piston 415, a dish spring 416, and a distance piece 417 are provided. The casing 413 has a cylindrical shape whose bottom is fixed by a male screw 418 to the body of the fuel injection pump 40.

The electroexpansive actuator 414 is, in this case, a columnar laminate of 50 piezoelectric elements each having a diameter of 15 mm and a thickness of 0.5 mm.

The distance piece 417 is of a disk type which has a hole 419 at the center thereof. The diameter of the distance piece 417 is larger than that of the piston 415. Thus, when the male screw 418 of the casing 413 is tightened, the distance piece 417 is sandwiched by the casings 412 and 413, thus sealing a variable fuel chamber 420 which leads via the hole 419 to a pump chamber 421.

An O ring 422 is provided at the outer periphery of the piston 415.

The electroexpansive actuator 414 is controlled by an electroexpansive actuator control unit 109' which is included in a microcomputer which also can control the timer piston (not shown) for the fuel injection timing and the level 410a of the spill ring 410 for the fuel injection amount.

The electroexpansive actuator control unit 109' will be explained with reference to FIG. 9. The electroexpansive actuator control unit 109' is similar to that of FIG. 4. However, a DC/DC converter 91' is used only for the repolarization of the electroexpansive actuator 414, and two relay circuits 202 and 204 are provided for switching the DC/DC converter 91'. Further, a fuel injection rate driver circuit 205 is provided for carrying out to a so-called pilot injection.

The DC/DC converter 91' has a self-excited oscillator circuit which comprises a piezoelectric oscillator 911' and a capacitor 912' having the same capacity as the oscillator 911'. The emitter of a PNP type transistor 913' is connected to a contact 204b of the relay circuit 204. The collector of the transistor 913' is connected to that of the transistor 914'. The base of the transistor 913' is connected via a resistor 915' to a movable point of a variable resistor 917', while the base of the transistor 914' is connected via a resistor 916' to a movable point of a variable resistor 918'. The variable resistor 917' has a terminal connected to the contact 204b of the relay circuit 204. The connection point of the variable resistors 917' and 918' is connected to a terminal of a capacitor 919' whose other terminal is grounded. The connection point of the collectors of the transistors 913' and 914' is connected to a terminal of a capacitor 920' as well as to a terminal of the oscillator 911'. The oscillator 911' has another terminal connected to the cathode of a diode 921', to the anode of a diode 922', and to the above-mentioned capacitor 912'. The anode of diode 921' is connected to the contact 204b of the relay circuit 204. The cathode of the diode 922' is connected via resistor 923' to a normally-open terminal 202c of the relay circuit 202.

The fuel injection rate control circuit 205 comprises a resistor 205a, as thyristor 205b connected in series to the resistor 205a, and a diode 205c.

Figure 9:
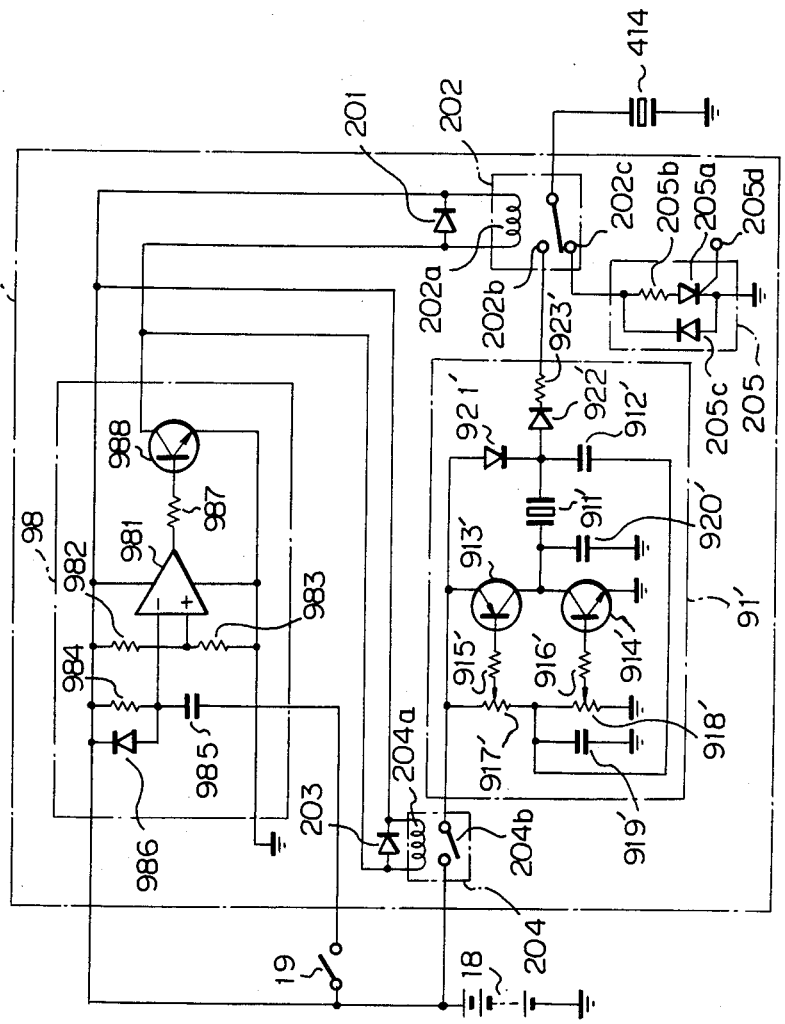
FIG. 9 is a circuit diagram of the electroexpansive actuator control unit of FIG. 8.

In FIG. 9, when the ignition switch 19 is turned on, the coil 202a of the relay circuit 202 is not energized so that the normally-off contact 202b thereof is turned on. Thus, the electroexpansive actuator 414 is controlled by the fuel injection rate control circuit 205, thereby carrying out a pilot injection which can reduce noise and vibration of the fuel injection pump 40.

Figure 10:
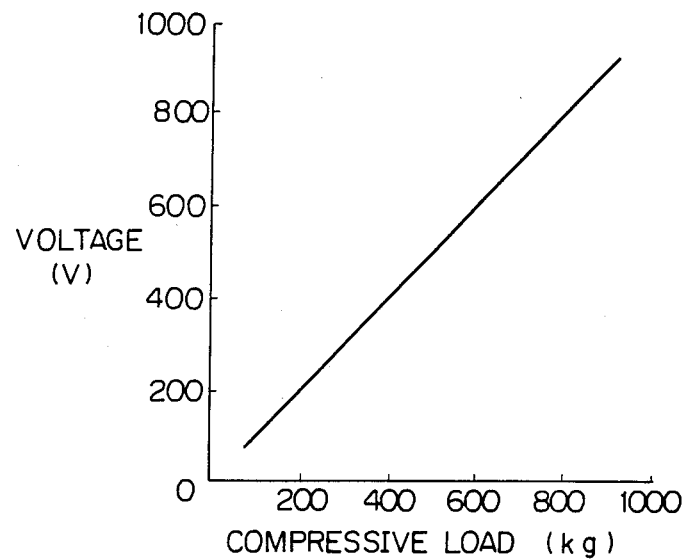
FIG. 10 is a graph showing the relationship between the compressive load and the voltage of the electroexpansive actuator of FIG. 8.
Figure 11:
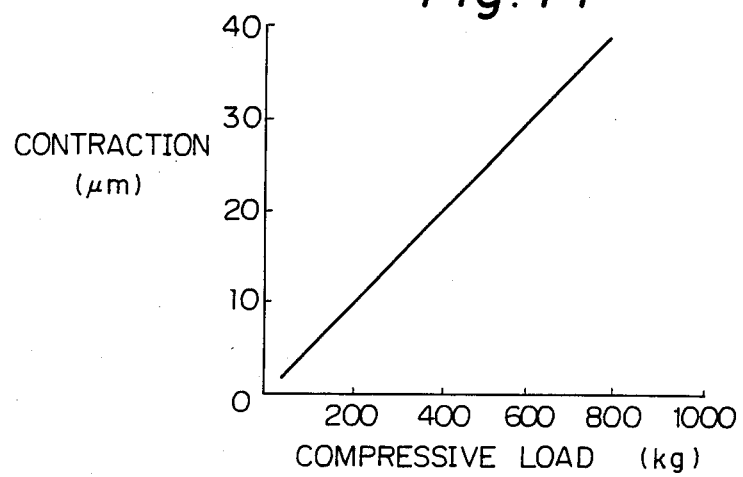
FIG. 11 is a graph showing the relationship between the compressive load and the contraction of the electroexpansive actuator of FIG. 8.

When 500 V is applied to one piece of the piezoelectric element along its axis direction, an expansion of about 0.5 μm is obtained. Therefore, if the electroexpansive actuator 414 is constructed by a laminate of 50 such piezoelectric elements, the application of 500 V to the actuator 414 generates a 25 μm expansion. Also, in this state, if 500 V is released or a small negative voltage is applied to the electroexpansive actuator 414, this actuator 414 is contracted by about 25 μm thus recovering its original state. Also, if a load is applied to each piezoelectric element along its axial direction, this element generates a voltage corresponding thereto. For example, as illustrated in FIG. 10, when a compressive load of 500 kg is applied to the electroexpansive actuator 414, the actuator 414 generates a voltage of 500 V. In a state where a compressive load is applied to the electroexpansive actuator 414, when the terminals of the electroexpansive actuator 414 are shorted-out, contraction is generated in the electroexpansive actuator 414 along the axis direction, as illustrated in FIG. 11. For example, in a state where a compressive load of 500 kg is applied to the electroexpansive actuator 414, when this actuator 414 is shorted-out, this actuator 414 is contracted by 25 μm.

Note that the short-circuited state and open state of the electroexpansive actuator 414 is controlled by the fuel injection rate control circuit 205.

Expansion and contraction of the electroexpansive actuator 414 is transmitted to the piston 415, thereby contracting and expanding the volume of the variable fuel chamber 420.

If the fuel injection rate control circuit 205 does not carry out an operation, so that the electroexpansive actuator 412 is in an open state, the pressure of the fuel pump chamber 421 changes as indicated by a dotted line $P_1$ in FIG. 12A. In this case, when the pressure of the fuel pump chamber 421 is larger than a predetermined value $P_0$, i.e., when the spill port 409 is covered by the spill ring 410, the delivery valve 408 is opened to inject fuel from the fuel injection nozzle 31. Also, the lift amount of the delivery valve 408 is approximately in proportion to the pressure of the fuel pump chamber 421, and accordingly, the injected fuel amount is approximately in proportion to the pressure of the fuel pump chamber 421.

Further, charges in proportion to the pressure of the fuel pump chamber 421 are generated in the electroexpansive actuator 414, thereby generating a voltage as illustrated in FIG. 10. In this case, if the area of the piston 415 is about 4 $cm^2$ and the opening pressure of the delivery valve 408 is 100 $kg/cm^2$, then the voltage generated by the electroexpansive actuator 414 at the beginning of the injection is 400 V.

The fuel injection rate control circuit 205 operates as follows. When the voltage generated by the electroexpansive actuator 414 reaches 500 V, a trigger pulse is supplied from the control circuit (not shown) to the terminal 205d of the thyristor 205a, thereby turning on the thyristor 205a. As a result, as illustrated in FIG. 12B, the electroexpansive actuator 414 is shorted-out. Note that the diode 205c is used for recovering the electroexpansive actuator 414 by releasing negative charges stored therein. At the moment when the electroexpansive actuator 414 is shorted-out the electroexpansive actuator 414 is contracted by about 25 μm, so that the variable fuel chamber 420 is expanded by 10 $mm^3$ (=4 $cm^2 \times 25$ μm). As a result, the pressure of the pump chamber 421 is reduced as indicated by $P_2$ in FIG. 12A, and accordingly, the fuel injection by the fuel injection nozzle 31 is temporarily stopped, thereby realizing a pilot injection.

A repolarization operation is carried out after the ignition switch 19 is turned off, in the same way as in FIG. 4. That is, when the ignition switch 19 is turned off, the timer circuit 98 energizes the relay circuits 202 and 204 for about 5 s. As a result, the DC/DC converter 91' is operated so that a high voltage is applied to the electroexpansive actuator 414. Thus, a repolarization operation is carried out.

As illustrated in FIG. 13, in view of the repolarization, it is preferable to apply a voltage higher than 300 V to the electroexpansive actuator 414 including a laminate of 80 piezoelectric elements each having a diameter of 15 mm and a thickness of 0.5 mm. That is, it is preferable to generate an electric field higher than 600 V/mm in the electroexpansive actuator. As illustrated in FIG. 14, when 300 V is applied to such an electroexpansive actuator, this actuator recovers its initial start within a few seconds.

In FIG. 9, the timer circuit 98' of FIG. 7 can be used instead of the timer circuit 98. In this case, a repolarization is carried out for about 5 s when about 20 s has passed after the ignition switch 19 is turned off. Note that it is impossible to perform a sufficient repolarization upon the electroexpansive actuator 414 by applying a high voltage thereto under a loaded state. In this regard, when the timer circuit 98' of FIG. 7 is used, a repolarization is carried out after the residual load of the fuel pump chamber 421 is released, thus sufficiently carrying out a repolarization.

The DC/DC converter 91' of FIG. 9 operates as follows. The resistors 917' and 918' generate bias voltages for the bases of the transistors 913' and 914', respectively. In a non-oscillation state, since no base current flows through each of the transistor 913' and 914', no emitter current flows through the transistor 913', so that the potential at the terminal of the oscillator 911' becomes zero. However, when a differential potential fluctuation is generated at the base of the transistor 913' due to external disturbance, a base current flows through the transistor 913' so as to flow a current through the emitter thereof, thus increasing the potential at the collector of the transistor 913', i.e., the potential at the oscillator 911'. As a result, the oscillator 911', is expanded, and simultaneously, positive charges are generated at the terminals of the oscillator 911' due to the secondary electroexpansive effect. Thus, in a peripheral circuit formed by the transistor 914', the oscillator 911', the capacitor 912', and the capacitor 919', the potential thereof is increased due to the above-mentioned charges. In this case, the oscillator 913' is resonated with an alternating voltage generated by the transistor 913' and 914', thus carrying out a self-excited oscillation. As a result, the potential at the connection of the oscillator 911' and the capacitor 912' is 50 times as much as the potential at the collectors of the transistors 913' and 914'. Therefore, since the potential at the capacitor 919' increased, the emitter current of the transistor 913' is decreased. Subsequently, when the potential at the base of the transistor 914' exceeds its threshold voltage, a collector current begins to flow through the transistor 914', so as to decrease its collector potential, thus rapidly contracting the oscillator 911'. As a result, negative charges are generated at the terminals of the oscillator 911' due to the secondary electroexpansive effect. As a result, the potential at the connection of the oscillator 911' and the capacitor 912' is −50 times as much as the potential at the collectors of the transistors 913' and 914'. As a result, the base potential of each of the transistors 913' and 914' is reduced, and accordingly, the collector current of the transistor 914' is stopped while the base current and emitter current of the transistor 913' flow, thus again increasing the collector potential of the transistor 913'. The above-mentioned operations are repeated to obtain a resonant operation whose frequency is determined by the mechanical resonance frequency of the electroexpansive oscillator 911'. The negative voltage generated at the connection of the oscillator 911' and the capacitor 912' is shifted by the diode 921' towards the power supply voltage, thus obtaining a potential 100 times as much as the potential at the capacitor 920'. Thus, if the voltage of the battery 18 is 12 V, a direct voltage of about 800 V to 1 kV is obtained at the output of the DC/DC converter 91'. In this case, no problem due to the fluctuation resonance frequency by the temperature occurs, since the DC/DC converter 91' uses a self-excited oscillation.

Various modifications of the fuel injection ratio control circuit 205 of FIG. 9 are possible.

A modification of the fuel injection ratio control circuit is illustrated in FIG. 15. In FIG. 15, a series of an inductor 1501 and a thyristor 1502 is connected in parallel to a series of an inductor 1503 and a thyristor 1504. In this case, the conduction direction of the thyristor 1502 is opposite to that of the thyristor 1504. Also, a capacitor 1505 is provided for storing the charges of the electroexpansive actuator 414. Note that a diode 1506 corresponds to the diode 205c of FIG. 9.

The operation of the fuel injection rate control circuit 205-1 of FIG. 15 will be explained with reference to FIGS. 16A through 16E. Note that, in this case, the relay circuit 202 is not energized so that the contact 202c is turned on. As illustrated in FIG. 16A, when the voltage of the electroexpansive actuator 414 exceeds a predetermined voltage corresponding to an opening pressure $P_0$ by which the delivery valve 408 is opened, a trigger signal is supplied from the control circuit (not shown) to the gate terminal 1502a of the thyristor 1502 as shown in FIG. 16B. Note that FIG. 16A shows the pressure P of the fuel pump chamber 421. Thus, the thyristor 1502 is turned on, and accordingly, a serial resonance circuit is formed by the electroexpansive actuator 414, the inductor 1501, and the capacitor 1505. As a result, the charges generated at the electroexpansive actuator 414 are moved to the capacitor 1505. That is, the electroexpansive actuator 414 is in a short-circuited state, and is, therefore, contracted. In this case, the pressure of the fuel pump chamber 421 is reduced by the contraction of the electroexpansive actuator 414, thus carrying out a pilot injection as shown in FIG. 16E. Then, at a timing after a fuel compressing stroke is completed and before another fuel compressing stroke is initiated, a trigger signal is supplied from the control circuit (not shown) to the gate terminal 1504a of the thyristor 1504 as shown in FIG. 16C. Thus, the thyristor 1504 is turned on, and accordingly, a serial resonance circuit is formed by the capacitor 1505, the inductor 1503, and the electroexpansive actuator 414. As a result, the charges stored in the capacitor 1505 and actuator 414 are moved to the electroexpansive actuator 414. As a result, a voltage of about 300 V is applied to the electroexpansive actuator 414, as shown in FIG. 16D. After that, a further fuel compressing stroke is carried out so as to push up the potential at the electroexpansive actuator 414. Finally, at a timing when the thyristor 1502 is turned on, this potential reaches 800 V (=300 V+500 V), since the potential at the electroexpansive actuator 414 is already 300 V immediately before the further fuel compressing stroke. Therefore, at such a timing, the electroexpansive actuator 414 is contracted by about 30 μm corresponding to 800 V (see FIG. 11).

Figure 17:
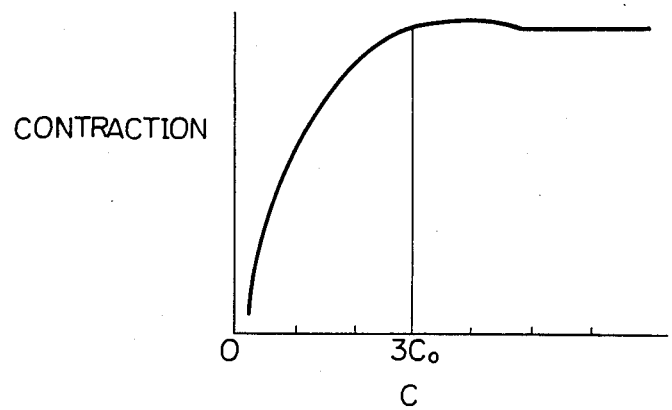
FIG. 17 is a graph showing the capacity characteristics of the capacitor of FIG. 15.

The relationship between the capacity C of the capacitor 1505 and the contraction of the electroexpansive actuator 414 of FIG. 15 is shown in FIG. 17. That is, if the capacity C of the capacitor 1505 is three times larger than the capacity C of the electroexpansive actuator 414, the contraction thereof is saturated. Therefore, it is preferable to satisfy the following relationship:

$$C \geq 3C_0.$$

Figure 18:
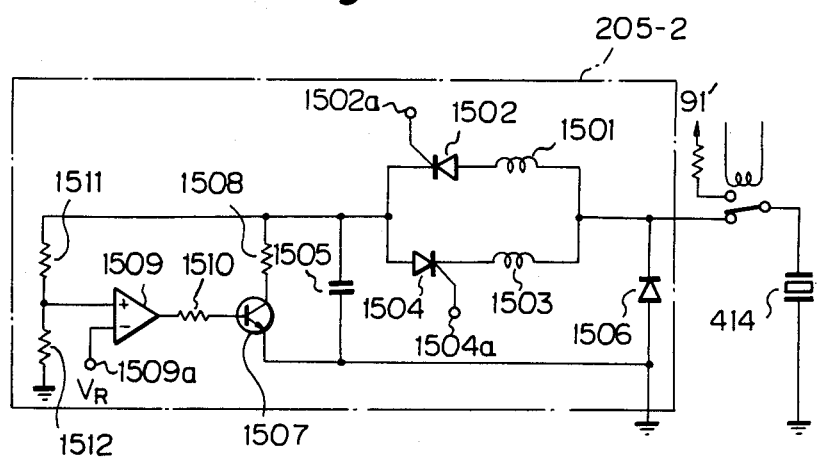
FIG. 18 is a circuit diagram of another modification of the fuel injection rate control circuit of FIG. 9.

In FIG. 18, which illustrates another modification of the fuel injection rate control circuit of FIG. 9, a transistor 1507, a resistor 1508, a comparator 1509, and resistors 1510 through 1512 are added to the elements of the fuel injection rate control circuit 205-1 of FIG. 15, in order to control the charges stored in the capacitor 1505, thereby electrically controlling the contraction of the electroexpansive actuator 414. A reference voltage $V_R$ is applied to the negative input of the comparator 1509.

The operation of the circuit of FIG. 18 is as follows. The additional elements 1505 through 1512 serve as a kind of shunt regulator for controlling the voltage of the capacitor 1505 so that it is in proportion to the reference voltage $V_R$. That is, if the voltage of the capacitor 1505 is 600 V and the division ratio by the resistors 1511 and 1512 is 1/100, then a voltage of 6 V (=600×1/100) is applied to the non-inverting terminal of the comparator 1509. In addition, if the reference volta $V_R$ is 3.5 V, the output potential of the comparator 1509 is increased to turn on the transistor 1507, thus discharging the charges stored in the capacitor 1505 therethrough. Then, when the voltage of the capacitor 1505 becomes lower than 350 V, i.e., when the voltage at the non-inverting terminal of the comparator 1509 becomes lower than 3.5 V, the output potential of the comparator 1509 is decreased to turn off the transistor 1510. Thus, the voltage of the capacitor 1505 is maintained at 350 V corresponding to the reference voltage $V_R$ (=3.5 V). Therefore, the voltage of the capacitor 1505 after its discharging operation can be controlled by changing the reference voltage $V_R$, and accordingly, the contraction amount of the electroexpansive actuator 414 can be freely adjustable by changing the reference voltage $V_R$.

In FIG. 19, which illustrates a further modification of the fuel injection rate control circuit of FIG. 9, a thyristor 1513 and a resistor 1514 added to the elements of FIG. 18, for carrying out a more reliable pilot injection.

The fuel injection rate control circuit 205-3 of FIG. 19 will be explained with reference to FIGS. 20A through 20G. First, it is assumed that the capacitor 1505 is charged at a high voltage of 600 V as shown in FIG. 20G, the voltage of the electroexpansive actuator 414 is 0 V, as shown in FIG. 20B. In this state, when a fuel compressing stroke is started, the pressure P of the fuel pump chamber 421 is increased as shown in FIG. 16A, and accordingly, the voltage of the electroexpansive actuator 414 is increased as shown in FIG. 20B. When the pressure P of the fuel pump chamber 421 exceeds a predetermined value smaller than the opening value $P_0$ by which the delivery valve 408 is opened, a trigger signal is supplied from the control circuit (not shown) to the terminal 1504a of the thyristor 1504 as shown in FIG. 20C. As a result, the thyristor 1504 is turned on so that the charges stored in the capacitor 1505 are returned to the electroexpansive actuator 414, thus, rapidly increasing the voltage thereof, as shown in FIG. 20B. Therefore, the electroexpansive actuator 414 is expanded by 15 μm. Then, when the pressure P of the fuel pump chamber 421 exceeds the opening value $P_0$, a fuel injection is initiated thereby carrying out a pilot injection as shown in FIG. 20F. Thus, the timing of a pilot injection is controlled by the trigger signal supplied to the thyristor 1504.

When a predetermined time period has passed after the thyristor 1504 is triggered, a trigger signal is supplied from the control circuit (not shown) to the terminal 1513a of the thyristor 1513. As a result, the thyristor 1513 is turned on so as to short-circuit the electroexpansive actuator 414 as shown in FIG. 20B, thereby contracting the actuator 414 by about 15 μm which is about the same amount as the above-mentioned expansion. Thus, the pressure P of the fuel pump chamber 421 is reduced to stop the injection, thereby completing a pilot injection.

In the above-mentioned state, since the plunger 404 continues the fuel compressing stroke, the pressure P of the fuel pump chamber 421 is again increased to restart a fuel injection. In this case, the voltage of the electroexpansive actuator 414 is also increased. When the voltage of the electroexpansive actuator 414 reaches its peak, which is, for example, about 800 V, a trigger signal is supplied from the control circuit (not shown) to the terminal 1502a of the thyristor 1502. As a result, the charges stored in the electroexpansive actuator 414 are moved to the capacitor 1505, so that the capacitor 1505 is charged at 600 V as shown in FIG. 20G. In this case, although the pressure P of the fuel pump chamber 421 is a little reduced, as indicated by an arrow X in FIG. 20A, the pressure P is considerably higher than the opening value $P_0$, and no interruption occurs in a fuel injection. After that the spill port 409 is opened so as to complete the fuel injection.

In the circuit of FIG. 19, when the voltage of the capacitor 1505 is increased by increasing the reference voltage $V_R$ applied to the comparator 1509, the compression of the electroexpansive actuator 414 is increased at the turning-on of the thyristor 1504, thereby obtaining a large pilot injection amount. Contrary to this, when the voltage of the capacitor 1505 is decreased by decreasing the reference voltage $V_R$ applied to the comparator 1509, the compression of the electroexpansive actuator 414 is decreased at the turning-on of the thyristor 1504, thereby obtaining a small pilot injection amount.

In FIGS. 18 and 19, the reference voltage $V_R$ applied to the comparator 1509 can be controlled in accordance with the temperature of the engine coolant, the atmospheric pressure, and the like. Also, in each of the fuel injection rate control circuits of FIGS. 9, 15, 18, and 19, various timing signals are required for turning the thyristors. Such timing signals can be generated by the control circuit (not shown) which can detect the voltage of the electroexpansive actuator 414, the pressure of the fuel pump chamber 421, or the rotational speed of the fuel injection pump 40.

Various modifications of the DC/DC converter 91' of FIG. 9 are possible.

Figure 21:
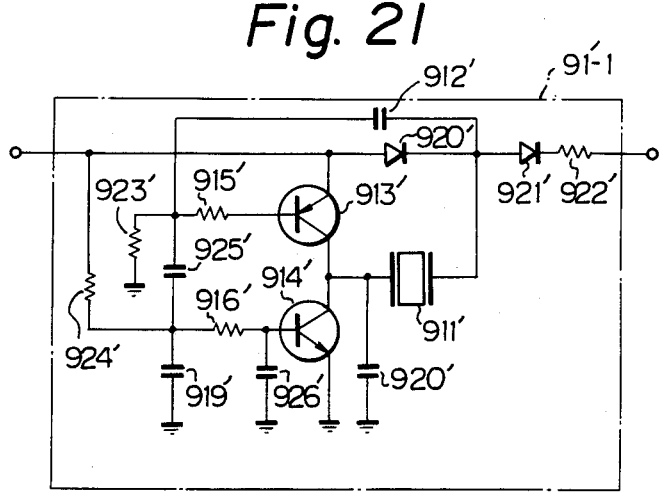
FIGS. 21 through 25, are circuit diagrams of modifications of the DC/DC converter of FIG. 9.

A modification of the DC/DC converter is illustrated in FIG. 21. In FIG. 21, the variable resistors 917' and 918' of FIG. 9 are not provided, and instead, resistors 923' and 924' and capacitors 925' and 926' are provided. In addition, the feedback capacitor 912' is connected to the resistor 915'. As a result, since the resistance for limiting the base current of the transistor 914' no longer limits the base current of the transistor 913', a sufficient emitter current of the transistor 913' can be obtained. Note that, if the capacity of the capacitor 926' is increased, the capacitor 919' can be omitted.

Figure 22:
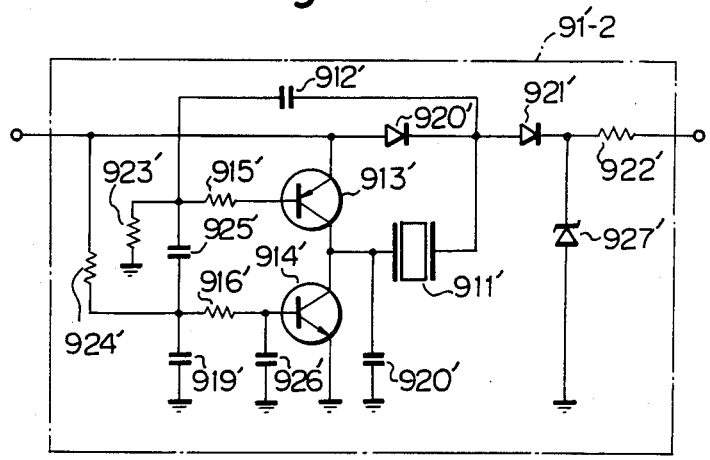

In FIG. 22, which illustrates another modification of the DC/DC converter of FIG. 9, a Zener diode 727' is added to the elements of FIG. 21. According to this modification, even when its input voltage is too high due to a fluctuation thereof, its output voltage can be lower than a definite value determined by the Zener diode 927', thereby avoiding failure of the electroexpansive actuator 414 due to the leakage of current when the actuator 414 is polarized.

Figure 23:
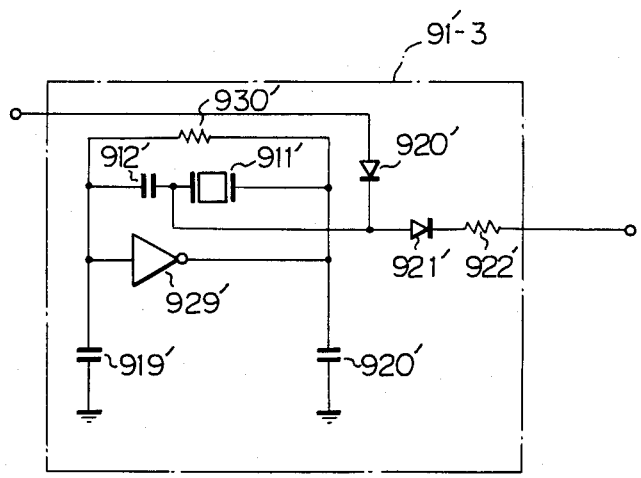

In FIG. 23, which illustrates a further modification of the DC/DC converter of FIG. 9, a series of the oscillator 911' and the capacitor 912' are connected to a Colpitts type oscillator circuit. That is, the capacitor 912' is connected to an input terminal of an inverter 929', and the oscillator 911' is connected to an output terminal of the inverter 929'. A resistor 930' is connected in parallel to the series of the oscillator 911' and the capacitor 912'. The anode of the diode 921' is connected to the connection point of the oscillator 911' and the capacitor 912'. According to this modification, although the structure of the DC/DC converter is simple, this is preferable for generating a low output voltage.

Figure 24:
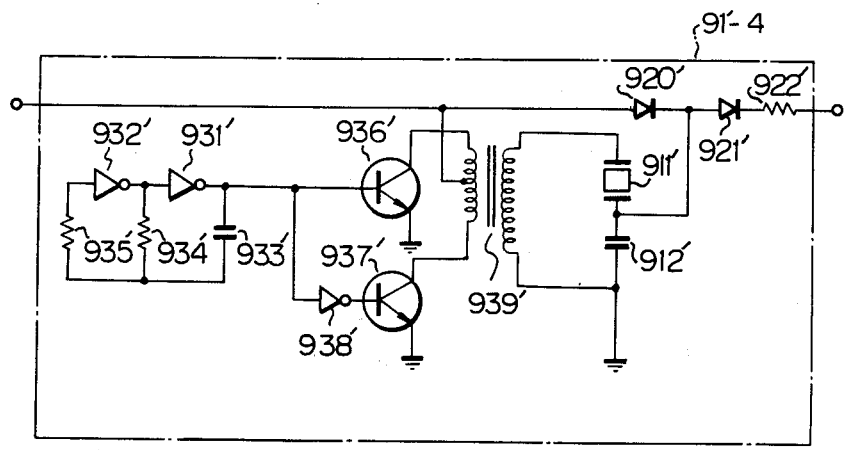

In FIG. 24, which illustrates a still further modification of the DC/DC converter of FIG. 9, inverters 931' and 932' are connected in series to each other, and a capacitor 933', and resistors 934' and 935' are connected thereto, thereby forming a capacitor-resistor (CR) oscillator circuit. The oscillation frequency of this CR oscillator circuit is determined by the capacitor 933' and the resistor 934'. A base of an NPN type transistor 936' is connected directly to the CR oscillation circuit, and a base of an NPN type transistor 937' is connected via an inverter 938' to the CR oscillation circuit. The emitters of the transistors 936' and 937' are grounded, and their collectors are connected to the primary winding of a tranformer 939'. The secondary winding of the transformer 939' is connected to the series of the oscillator 911' and the capacitor 912'. Also, the relay circuit 204 is connected to a tap at an intermediate portion of the primary winding of the transformer 939' (FIG. 9).

The operation of the circuit of FIG. 24 is as follows. If the oscillation frequency of the oscillator 911', a voltage generated at the secondary winding of the transformer 939' switched by the transistors 936' and 937' is applied to the series of the oscillator 911' and the capacitor 912', thereby generating a high voltage at the connection point of the oscillator 911' and the capacitor 912'.

In FIG. 24, the turn ratio of the primary winding to the secondary winding in the transformer 939' can be arbitrarily determined, however, there is a limit to the turns of the secondary winding in view of the oscillation frequency of the oscillator 911'.

The modification of FIG. 24 is helpful in generating a higher voltage and a higher power.

Figure 25:
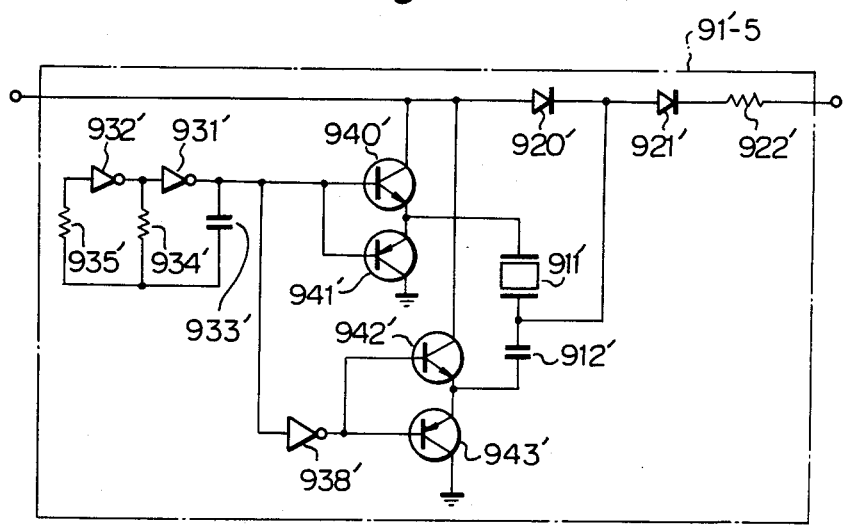

In FIG. 25, which illustrates a further modification of the DC/DC converter of FIG. 9, wherein transistors 940', 941', 942', and 943' are provided instead of the transistors 936' and 937', and the transformer 939', thereby applying a voltage (24 V) twice as large as the battery voltage (12 V) to the oscillator 911'. That is, the CR oscillation circuit is connected directly to the bases of the transistors 940' and 941', and the CR oscillation circuit is connected via the inverter 938' to the transistors 942' and 943'. Therefore, when the output potential of the CR oscillation circuit is high, the transistors 940' and 943' are turned on so that the series of the oscillator 911' and the capacitor 912' is positively biased. Contrary to this, when the output potential of the CR oscillation circuit is low, the transistors 941' and 942' are turned on so that the series of the oscillator 911' and the capacitor 912' is negatively biased. Thus, the oscillator 911' is driven by a voltage twice that of the battery voltage.

We claim:

1. An apparatus for controlling an electroexpansive actuator comprising:
   means for controlling expansion and contraction of said electroexpansive actuator;
   means for generating a high voltage; and
   means for applying said high voltage to said electroexpansive actuator for a first predetermined time period when a second predetermined time period has passed after said expansion and contraction controlling means completes said expansion and contraction operation upon said electroexpansive actuator.

2. An apparatus as set forth in claim 1, wherein application of said high voltage to said electroexpansive actuator generates an electric field higher than 600 V/mm therein.

3. An apparatus as set forth in claim 1, wherein said expansion and contraction controlling means comprises:
   means for generating another high voltage which is lower than said high voltage;
   means for applying said another high voltage to said electroexpansive actuator thereby expanding or contracting said electroexpansive actuator; and
   means for releasing said another high voltage applied to said electroexpansive actuator thereby contracting or expanding said electroexpansive actuator.

4. An apparatus as set forth in claim 1, wherein said expansive and contraction controlling means comprises:
   means for applying a load to said electroexpansive actuator; and
   means for controlling an amount of charges of said electroexpansive actuator.

5. An apparatus for controlling the fuel amount supplied to a spark ignition internal engine comprising:
   a fuel injection valve having an electroexpansive actuator therein;
   means for generating first and second high voltages, said first voltage being lower than said second voltage;
   means for supplying fuel by applying said first voltage to said electroexpansive actuator to open said fuel injection valve; and
   means for applying said second voltage to said electroexpansive actuator for a first predetermined time period when a second predetermined time period has passed after said fuel supplying means has completed a fuel supplying operation upon said fuel injection valve.

6. An apparatus as set forth in claim 5, wherein application of said second voltage to said electroexpansive actuator generates an electric field higher than 600 V/mm therein.

7. An apparatus controlling the fuel amount supplied to a diesel engine comprising:
- a fuel injection valve;
- a cylinder bore;
- a plunger slidably mounted within said cylinder bore;
- a pump chamber formed by said cylinder bore and said plunger;
- an electroexpansive actuator;
- a variable fuel chamber disposed between said pump chamber and said electroexpansive actuator, the volume of said variable fuel chamber being changed by expansion and contraction of said electroexpansive actuator;
- means for supplying fuel from said pump chamber to said fuel injection valve;
- means for controlling the amount of charges means of said electroexpansive actuator;
- means for generating a high voltage;
- means for applying said high voltage to said electroexpansive actuator when said fuel supplying means does not carry out a fuel supplying operation.

8. An apparatus as set forth in claim 7, wherein said high voltage applying means applies said high voltage to said electroexpansive actuator for a predetermined time period immediately after said fuel supplying means has completed a fuel supplying operation.

9. An apparatus as set forth in claim 7, wherein said high voltage applying means applies said high voltage to said electroexpansive actuator for a first predetermined time period when a second predetermined time period has passed after said fuel supplying means has completed a fuel supplying operation.

10. An apparatus as set forth in claim 7, application of said high voltage to said electroexpansive actuator generates an electric field higher than 600 V/mm therein.

11. An apparatus as set forth in claim 7, wherein said charge controlling means comprises a switch element, linked between said electroexpansive element and the earth, for leaking the charges of said electroexpansive element to the earth when the pressure of said pump chamber reaches a predetermined value.

12. An apparatus as set forth in claim 7, wherein said charge controlling means comprises:
- a capacitor;
- a first switch element, linked between said electroexpansive actuator and said capacitor, for charging said capacitor by the charges of said electroexpansive actuator when the pressure of said pump chamber reaches a predetermined value; and
- a second switch element, linked between said capacitor and said electroexpansive actuator, for running the charges of said capacitor to said electroexpansive actuator at a predetermined timing after one fuel delivery stroke is completed.

13. An apparatus for controlling fuel supply to an internal combustion engine comprising:
- a d.c. electric power source associated with a key switch of said internal combustion engine;
- an electroexpansive actuator which expands and contracts in response to a first signal applied thereto to control said fuel supply;
- first means for generating said first signal when said internal combustion engine is in operation;
- second means for generating a second signal having a predetermined time interval in response to a change of said key switch from an ON position to an OFF position;
- third means, operatively connected to said d.c. power source, for generating a high voltage higher than a voltage of said d.c. power source; and
- fourth means for applying said high voltage of said third means to said electroexpansive actuator in response to said second signal of said second means so that said electroexpansive actuator is repolarized automatically each time said key switch is turned OFF.

* * * * *